United States Patent [19]

Swan

[11] Patent Number: 5,401,069
[45] Date of Patent: Mar. 28, 1995

[54] INFLATABLE RESCUE DEVICE

[75] Inventor: Scott A. Swan, Houston, Tex.

[73] Assignee: The United States of America as represented by the Administrator of the National Aeronautics and Space Administration, Washington, D.C.

[21] Appl. No.: 66,274

[22] Filed: May 4, 1993

[51] Int. Cl.⁶ .............................................. B25J 1/00
[52] U.S. Cl. ..................................... 294/1.1; 294/19.1; 244/158 R
[58] Field of Search ............ 294/1.1, 19.1, 66.1, 294/88; 15/144.3, 144.4; 16/115; 92/90-92; 212/185, 203, 268; 244/158 R, 161; 403/31, 50, 109; 414/729, 749-751; 441/80; 901/21, 22, 37

[56] References Cited

U.S. PATENT DOCUMENTS

| | | |
|---|---|---|
| 2,652,859 | 9/1953 | Murphy . |
| 3,465,986 | 9/1969 | Milly ........................... 294/19.1 X |
| 4,079,978 | 3/1978 | McMullin ........................ 294/19.1 |
| 4,466,649 | 8/1984 | Ozawa ........................... 294/19.1 |
| 4,470,335 | 9/1984 | Johns . |
| 4,551,061 | 11/1985 | Olenick ........................... 901/21 X |
| 4,615,260 | 10/1986 | Takagi et al. ................... 901/22 X |
| 4,953,905 | 9/1990 | Cohen ........................... 294/19.1 |
| 4,974,894 | 12/1990 | Dubow ........................... 294/19.2 |
| 5,099,748 | 3/1992 | Neubauer ........................... 91/26 |
| 5,116,093 | 5/1992 | Burns ........................... 294/19.1 |

Primary Examiner—Johnny D. Cherry
Attorney, Agent, or Firm—Hardie R. Barr; Edward K. Fein; Guy M. Miller

[57] ABSTRACT

This invention discloses, in one aspect, a personal rescue device for use in outer space which has an inflatable flexible tube with a shaper apparatus therein. Gas under pressure flows through the shaper apparatus and into the flexible tube. The flexible tube is mounted to the shaper so that as it inflates it expands and deploys lengthwise away from the shaper. In one embodiment a housing contains the shaper and the flexible tube and the housing is designed to facilitate movement of the expanding tube from the housing so the expanding tube does not bunch up in the housing.

16 Claims, 4 Drawing Sheets

INFLATABLE RESCUE DEVICE

ORIGIN OF INVENTION

The invention described herein was made by an employee of the United States Government and may be manufactured and used by or for the Government of the United States of America for governmental purposes without the payment of any royalties thereon or therefor.

BACKGROUND OF THE INVENTION

Field Of The Invention

This invention is related to inflatable tubular devices and, in one aspect, to such a device useful for inflation in outer space as a personal rescue device.

Description Of Related Art

The prior art includes a variety of rescue devices for reaching or snaring either a person or an object, such as poles, ropes, cables and objects attached to them such as hooks or grapples. Long slender metallic poles have a variety of problems when employed as personnel retrieval or rescue devices. Poles of relatively large mass are difficult to manipulate and control. A pole of any extended length is subject to buckling.

The prior art discloses a variety of apparatuses. U.S. Pat. No. 2,652,859 relates to a high altitude pressure responsive device in which a bellows shaped article is used to confine a gas. As altitude increases, local external pressure decreases causing a pressure differential in the apparatus and hence a displacement of the bellows. The degree of bellows expansion is correlated to the altitude obtained.

U.S. Pat. No. 4,466,649 relates to an extendable hand employed as an amusement device. In operation, a spring loaded release mechanism extends the arm in a telescoping fashion. A string and pulley system permit remote operation of the fingers and thumb of an end effector.

U.S. Pat. No. 4,470,335 relates to a method and apparatus for performing a remote attachment. An explosively propelled projectile is tethered to a launching mechanism and targeted to a receiving unit. The receiving unit is composed of two layers of material having different hardness. The material of the projectile is harder than the barrier layer of the target and softer than the target base material. In operation, the launched projectile penetrates the target barrier layer and deforms upon contact with the base layer. The deformation accounts for the attachment in that under high projectile speeds the barrier opens permitting entry of the small projectile, but the opening is too small to allow an exit of the larger deformed projectile. An attachment is made between the two objects. Applications of this device are directed to marine underwater activities, as well as applications in outer space.

U.S. Pat. No. 4,974,894 relates to a golf ball retriever device having a ball receptacle unit at the distal end of a telescoping pole. The device allows grasping of an object (golf ball) which is out of reach.

U.S. Pat. No. 5,099,748 relates to a pneumatically operated telescoping pole which is used as a component of a hoist mechanism.

U.S. Pat. No. 5,116,093 relates to a rescue apparatus comprising an end effector for attaching to clothing and a telescoping pole to extend reach.

There has long been a need for an effective personnel rescue device, particularly one suited for use in outer space. There has long been a need for such a device whose length is selectively incrementally adjustable, but whose mass is relatively low. There has long been a need for such a device that takes up relatively little storage space. There has long been a need for such a device which is self-powered and which may be used by either personnel effecting the rescue or the person to be rescued herself or himself.

SUMMARY OF THE PRESENT INVENTION

The present invention, in one aspect, discloses a rescue device with an inflatable flexible tube having a first end and a closed second end and being extendable from a stowed length to a deployed length; a shaper within the flexible tube, the flexible tube's first end secured to a first end of the shaper; the shaper having a gas channel therethrough so that gas under pressure supplied to the shaper flows through the gas channel and into the flexible tube, the flexible tube sealed shut so that the entering gas inflates it; and the flexible tube expanding longitudinally and moving away from the shaper as it inflates to form an extended tubular member which can extend from a person to be rescued to another person or object.

In another embodiment a device as described above is disposed in a housing and the housing is sized and configured so that as the flexible tube inflates it does not bunch up within the housing but is deployed therefrom smoothly and evenly. In one aspect this may be effected by using a rigid solid enclosing tube within the housing which encloses the inflatable tube. In another embodiment of such a device, provision is made for the selective incremental deployment of the flexible tube from the housing by using an activation mechanism which selectively applies gas to the flexible tube and/or by using a braking mechanism to selectively impede deployment of the flexible tube from the device. In one aspect, a movable reaction piston movably disposed in a device housing for co-action with the inflating flexible tube facilitates the inflation and counteracts pressure forces created thereby.

Certain preferred embodiments of devices according to the present invention have one, more than one, or all of the following features: attachment apparatus on the distal end of the flexible tube to facilitate attachment to another object such as an exterior part of a space shuttle or space station; a selectively operable source of pressurized gas which, in one aspect, is small enough to render the device very portable and self-powered; a tube of desired length and with a stored-length to deployed-length ratio of at least 1 to 5 and most preferably at least 1 to 20; a flexible tube made from aramid fiber fabric impermeable to gas, e.g. urethane coated KEVLAR (TM) fabric; a separate gas canister with a flow line to the shaper and a flow regulator for regulating gas flow to the device; inert gas, e.g. nitrogen; a flexible tube which is about twenty feet long or more and weighs about one-half of a pound or less; selective vent means to vent gas from the device, in one aspect to render the flexible tube more pliable or to deflate it to facilitate translation therealong; and/or relief valve apparatus which is pre-set to relieve gas pressure in the device if it exceeds a certain predetermined level.

It is, therefore, an object of at least certain preferred embodiments of the present invention to provide:

New, useful, unique, efficient, and effective devices for retrieving or rescuing objects or personnel positioned apart from or moving away from a structure;

Such devices useful in outer space;

Such devices which are relatively small, relatively low in mass, and are self-powered;

Such devices with a tube extendable to at least twenty feet in length and with a stowed-length to deployed-length ratio of at least one to twenty.

Such devices which are selectively incrementally deployable; and

Such devices which can be automatically relieved if gas pressure therein reaches an undesired or unsafe level.

Certain embodiments of the invention reside not in any one feature, but in combinations of them herein disclosed or claimed. There has thus been outlined, rather broadly, some important features of the invention in order that the detailed description thereof that follows may be better understood, and in order that the present contributions to the arts may be better appreciated. There are, of course, additional features of the invention that will be described hereinafter and which are the subject matter of claims appended hereto. Those skilled in the art will appreciate that the conceptions, upon which this disclosure is based, may readily be utilized as a basis for the designing of other structures, methods and systems for carrying out purposes of the present invention. It is important, therefore, that the claims be regarded as including such equivalent constructions and all legal equivalents thereof insofar as they do not depart from the spirit and scope of the present invention.

The present invention recognizes and addresses the previously-mentioned problems and long-felt needs and provides a solution to those and other problems and a satisfactory meeting of those and other needs in its various possible embodiments and equivalents thereof. To one of skill in the art who has the benefit of this invention's realizations, teachings and disclosures, other and further objects and advantages will be clear, as well as others inherent therein, from the following description of presently-preferred embodiments, given for the purpose of disclosure, when taken in conjunction with the accompanying drawings.

DESCRIPTION OF THE DRAWINGS

So that the manner in which the above-recited features, advantages and objects of the invention, as well as others which will become clear, are attained and can be understood in detail, more particular description of the invention briefly summarized above may be had by reference to certain embodiments thereof which are illustrated in the appended drawings, which drawings form a part of this specification. It is to be noted, however, that the appended drawings illustrate certain preferred embodiments of the invention and are therefore not to be considered limiting of its scope, for the invention may admit to other equally effective or equivalent embodiments.

DESCRIPTION OF EMBODIMENTS PREFERRED AT THE TIME OF FILING FOR THIS PATENT

Figure 1:
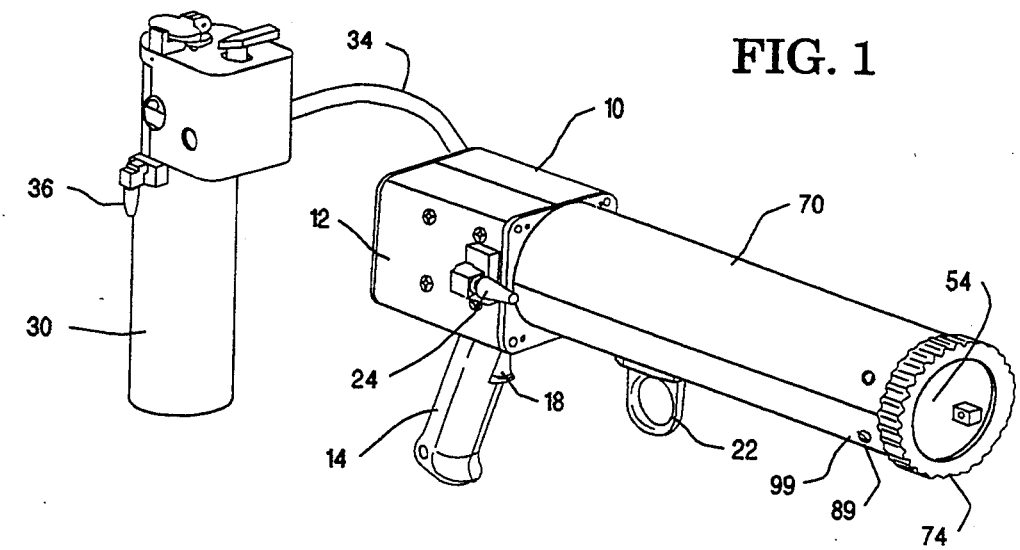
FIG. 1 is a perspective view of a device according to the present invention.
Figure 2:
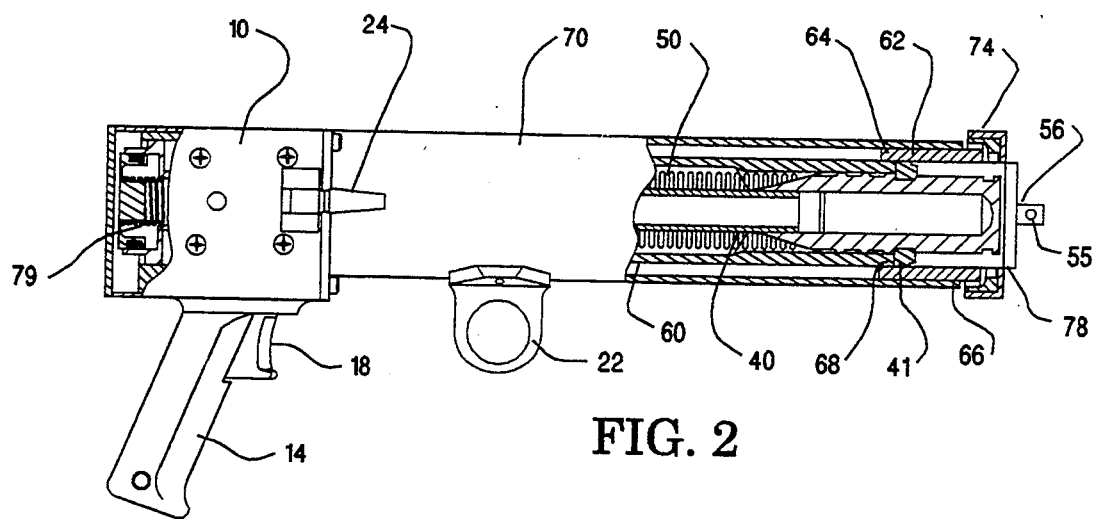
FIG. 2 is a side view, partially cutaway, partially in cross-section of the device of FIG. 1.
Figure 3:
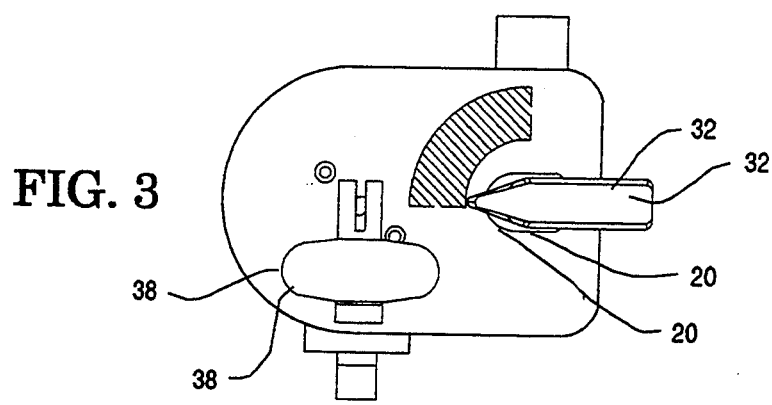
FIG. 3 is a top view of part of an apparatus in FIG. 4.

Referring now to FIGS. 1-3, a device 10 according to the present invention has a rear housing 12 to which is secured a barrel 70. A handle 14 extends from the housing 12 and has a trigger 18 movably mounted therein. A tether ring 22 on the barrel 70 permits attachment thereto of a line or other item. A standard hook 24 is useful for removably attaching the device 10 to another item such as an astronaut's space suit or to an equipment belt. Gas under pressure to inflate a fabric tube 50 within the barrel 70 is provided from a prior art gas canister 30 through a gas flow line 34. As shown in FIG. 3 a vent flow control 20 includes a vent control lever 32 which in turn controls valving (not shown) to permit flow ("READY"), to shut off flow ("OFF") or to release pressure so that the tube 50 deflates ("VENT"). A switch 38 is provided for turning flow from the canister 30 on and off. A standard hook 36 is desirable on the canister 30.

Figure 11A:
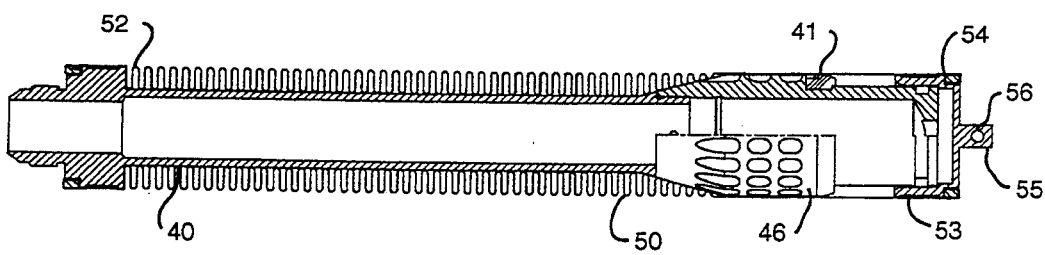
FIG. 11A shows in cross-section a shaper and fabric tube according to this invention.
Figure 8A:
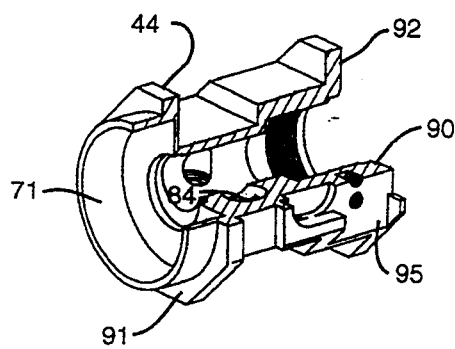
FIGS. 8A and 8B are perspective views of a slider for a device according to the present invention.

The tube 50 in its stowed configuration is folded or collapsed to its stowed length on shaper 40 as shown in FIGS. 2 and 11A. Also as shown in FIGS. 2 and 11A the fabric tube 50 (in one embodiment made from gas impermeable, urethane coated KEVLAR (TM) material) has a first end 52 and a second end 53. The second end 53 is secured to an end connection 54, e.g. with epoxy adhesive. The end connection 54 includes an end fitting 55 with a connection opening 56. An appropriate hook or connector can be releasably connected to the fabric tube 50 using the opening 56; e.g. a prior art hook 201 (FIG. 7) can be releasably connected to the end connection 54 for use in snaring another object such as part of a space vehicle, satellite, or space shuttle. A cover tube 60 encloses the fabric tube 50. There is a relatively close fit between the cover tube 60 and the fabric tube 50 so that the fabric tube 50, upon inflation, will move smoothly from the barrel 70 without bunching up therein. An end 68 of the cover tube 60 abuts a drag brake 62. The drag brake 62 is secured to the barrel 70 and has, in this embodiment, a top drag brake semi-ring 64 and a bottom drag brake semi-ring 66. Activation of the trigger 18 causes a brake insert 41 to back off from the drag brake 62, thereby freeing the fabric tube 50 for deployment from the barrel 70. A spring 79 mounted in the rear housing 12 biases forward a slider (e.g. as in FIG. 8A) and the shaper 40 to which it is connected. The barrel 70 has a front barrel fitting 74 which threadedly mates with the barrel 70. The fitting 74 has a front opening 78 through which extends the end connection 54.

Figure 11B:
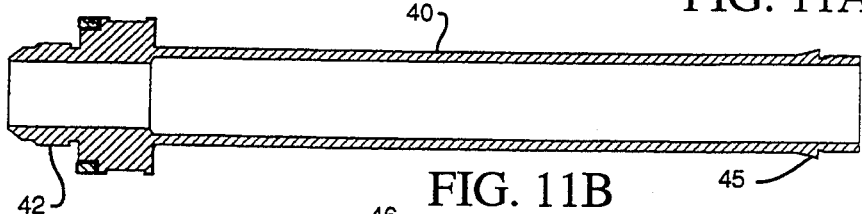
FIG. 11B shows the shaper of FIG. 11A.
Figure 11C:
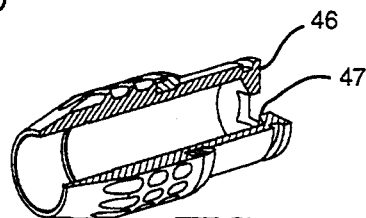
FIG. 11C shows in perspective a nose piece of the shaper of FIG. 11A.
Figure 11D:
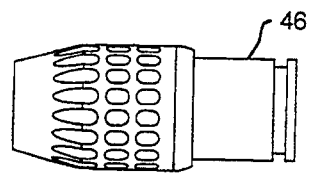
FIG. 11D is a side view of the nose piece of FIG. 11C.
Figure 8B:
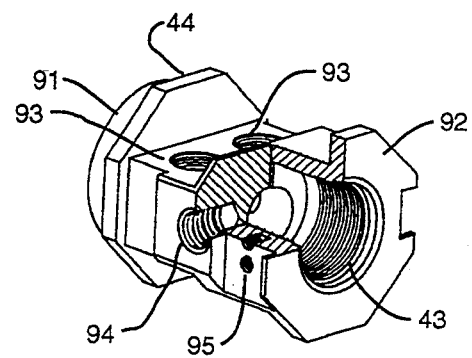
Figure 8C:
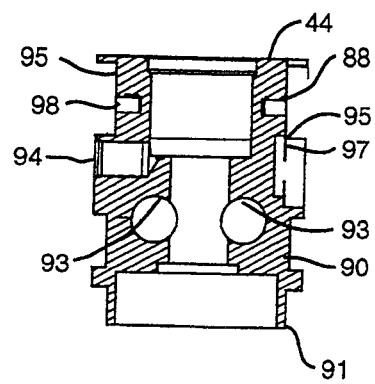
FIG. 8C is a view along line C—C of FIG. 8D which is a front view of the slider of FIG. 8A.
Figure 8F:
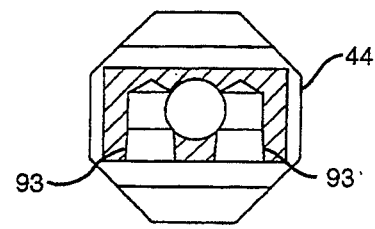
FIG. 8F a view along line F—F of FIG. 8E.
Figure 8D:
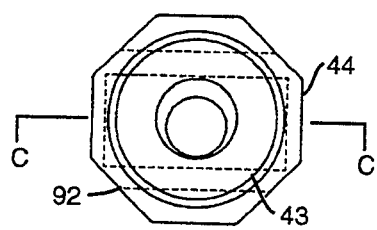
FIG. 8E a top view.
FIG. 8G a side view.
FIG. 8H a view of the other side.
Figure 8G:
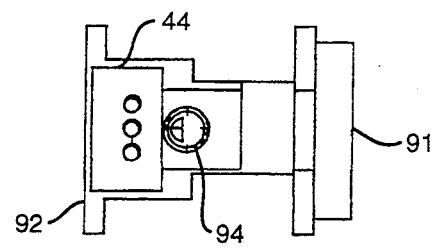
Figure 8E:
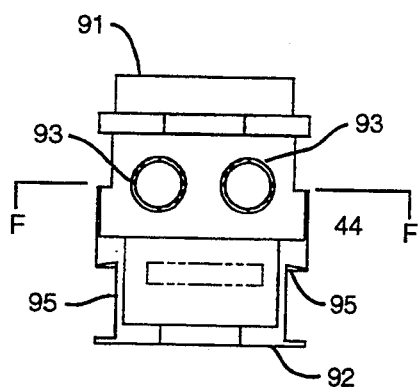
Figure 8H:
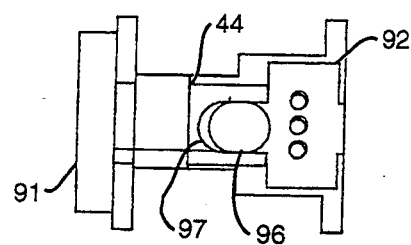

As shown in FIG. 11A and 11B, the fabric tube 50 is mounted about a shaper 40. The shaper 40 has a first end 42 which is threadedly screwable in an opening 43 of a slider 44 (FIG. 8B). At a second end 45 of the shaper 40 is secured a nose piece 46 with holes 47 through which air flowing through the shaper 40 passes into the fabric tube 50. Since the fabric tube end 52 is sealed to the first end 42 of the shaper 40 and the fabric tube end 53 is sealed to the connection 54 which has a solid body, gas cannot flow out from the device except into the fabric tube 50. Gas flows through an opening 47 at the end of the nose piece 46 and into the fabric tube 50.

As shown in FIGS. 2 and 11A, as the fabric tube 50 inflates and the tube 50 with the end connection 54 is deployed from the device 10, the tube is passing over the brake insert 41 and between the insert 41 and the rerings of the drag brake 62. This is made possible by pulling on the trigger 18 and overcoming the force of the spring 79 which normally pushes the slider 44 and hence the shaper 40 forward, wedging the inserts 41 against the brake semi-rings 64 and 66 which prevents passage of the tube 50 out from the device 10. Pulling the trigger 18 separates the insert 41 from the brake semi-rings 64 and 66 allowing inflating deployment of the fabric tube 50. After pulling the trigger 18 and after some partial deployment of the fabric tube 50, release of the trigger 18 again pushes the insert 41 against the brake semi-rings 64 and 66, catching and holding the fabric tube 50 therebetween, and preventing further fabric tube deployment of the fabric tube 50.

Figure 12A:
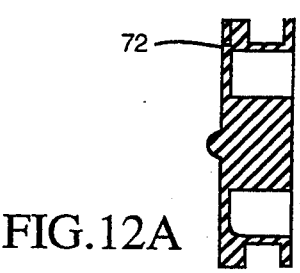
FIG. 12A is a side cross-sectional view of a piston of the device of FIG. 2.
Figure 12B:
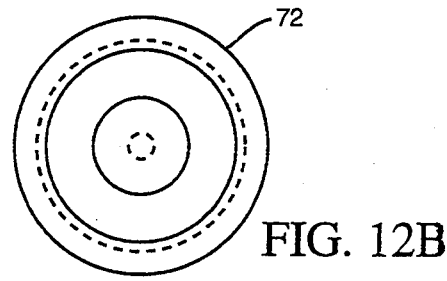
FIG. 12B is a front view of the piston of FIG. 12A.

A piston 72 (FIGS. 2 and 12A) is movably disposed in a piston cylinder 71 of the slider 44. The slider 44 is movably disposed in a guide 48 (FIG. 6A) which itself is secured to the housing 12. The piston has a range of movement in the piston cylinder 71 and it is biased rearwardly by the spring 79. The slider 44 can slide over the piston 72 and against the force of the spring 79, thus reaction force of the spring 79 and of the piston 71 balances the pressure loading within the device.

FIGS. 8A–8H show the slider 44 which has a body 90 with two ends 91 and 92. The slider 44 has two relief valve ports 93 in which are disposed relief valves (like the valves 264, FIG. 5B) which open when the pressure of gas in the fabric tube 50 or anywhere inside the pressurized volume of the device exceeds the setting of the relief valves, e.g. 50 p.s.i. Gas for inflating the fabric tube 50 enters the slider 40 through a gas inlet port 94.

In one embodiment a gas supply container is used which contains at a minimum enough gas to fill the fabric tube four times. In one embodiment the fabric tube holds about 470 cubic inches of gas at above 30 p.s.i.

Figure 6A:
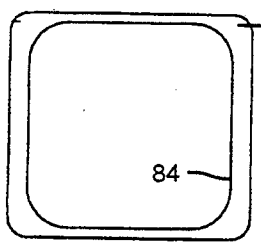
FIG. 6A is a rear view of a guide assembly for a device according to this invention.
Figure 6B:
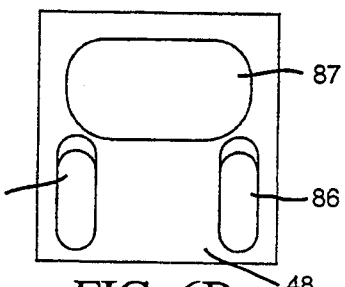
FIG. 6B is a top view of the assembly of FIG. 6A and, FIG. 6C is a side view of the assembly of FIG. 6A.
Figure 6C:
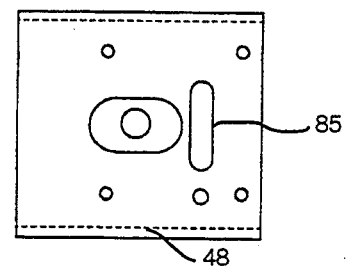

The guide assembly 48 shown in FIGS. 6A, 6B, and 6C has an opening 87 for the relief valves, openings 86 for a yoke and an opening 85 for inserting the pin that attaches the yoke to the slider. The slider 44 moves within a slider recess 84.

Figure 9A:
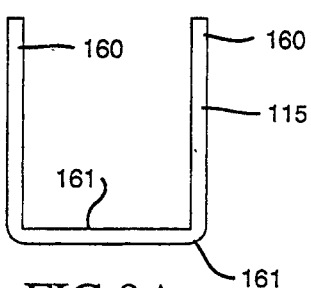
FIG. 9A is a front view of a yoke for a trigger for a device according to this invention and FIG. 9B is a side view of the yoke of FIG. 9A.
Figure 9B:
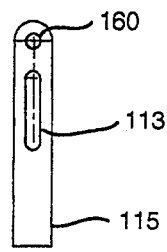
Figure 10:
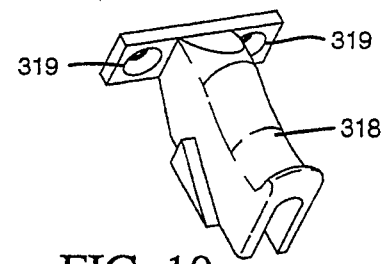
FIG. 10 is a bottom perspective view of a trigger for a device according to this invention and to which a yoke as in FIG. 9A is attachable.

FIGS. 9A and 9B show a yoke 115 with top holes 160 through which extend pivot pins which pivotably pin the yoke to the slider; and holes 161 into which are received screws for securing a trigger such as the trigger 318, FIG. 9. The trigger 318 has holes 319 through which screws are received for securement to a yoke like the yoke 115.

Figures 4, 5A, 5B, 7:
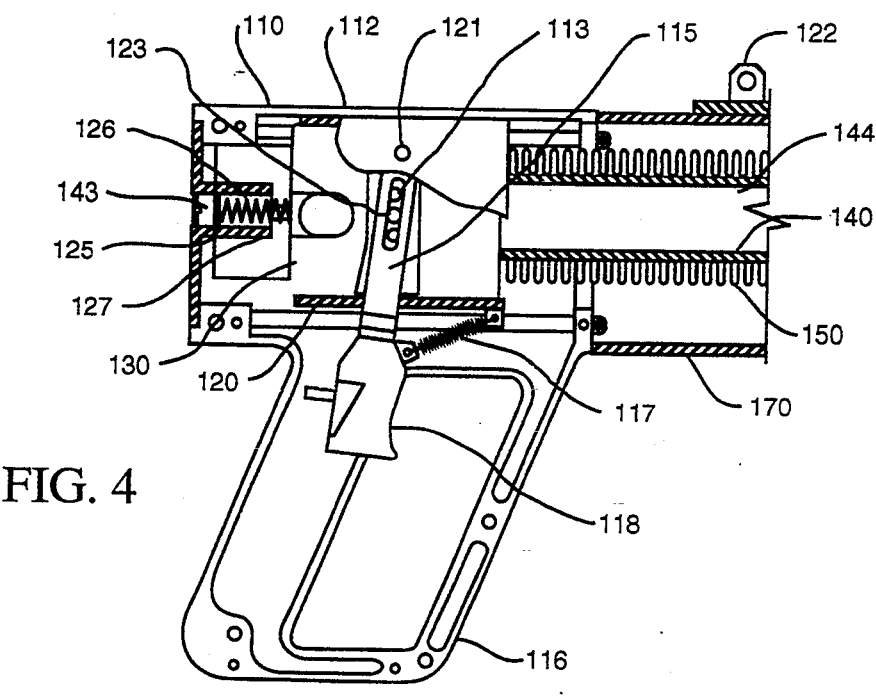
FIG. 4 is a side view in cross-section of a device according to the present invention.
FIG. 5A is a side view of part of a device according to the present invention.
FIG. 5B is a bottom view of the device of FIG. 5A.
FIG. 7 is a perspective view of a prior art hooking device.

FIG. 4 illustrates an embodiment of a device 110 according to the present invention. The end of the device 110 with a drag brake, etc. (end to the right in FIG. 4) is omitted, but is similar to what is shown in FIG. 2. The device 110 has a rear housing 112 and a barrel 170 in which is mounted an inflatable fabric tube 150 deployable from the barrel 170 upon inflation by gas under pressure (preferably an inert gas such as nitrogen). A shaper 140 within the fabric tube 150 has a gas flow channel 144 extending through it and a first end (to the left in FIG, 4) of the fabric tube 150 is sealingly secured to the shaper 140 so that upon introduction of gas under pressure into the gas channel 144, the gas moves through the channel then out through an end opening (not shown) in the shaper and into the interior of the fabric tube 150, inflating it for deployment from the barrel 170 (as previously described with reference to the device 10).

A trigger 118 is movably mounted in a handle 116 and the rear housing 112. A trigger spring 117 secured between the housing 112 and the trigger 118 returns the trigger to its normal position after it is pushed. The trigger 118 is connected to a yoke 115 (similar to the yoke shown in FIG. 9A). The yoke 115 pivots about a pivot pin 121 and moves thru slider 130. Movement of the yoke 115 rearwardly moves the slider rearwardly (thus separating a brake insert from a brake as previously described for the device 10). Activation of the trigger moves the slider 130 to which it is connected and thus the shaper 140 to the rear, thereby disengaging the brake (not shown) and freeing the fabric tube 150 for deployment. A spring 126 in a spring guide 127 of a spring housing 125 biases the slider 130 forward and thus the shaper 140 connected to it. A movable screw 143 to which the spring 126 is mounted is rotatable to adjust the forward force on the slider 130 to adjust the braking force. The yoke 115 has a recess 113 for accessing pins 123 which connect the yoke 115 to the slider 130, permitting adjustability of the slider travel.

A tether ring 122 is provided for attaching a line or other item to the device 110.

FIGS. 5A and 5B illustrate a device 200 according to the present invention which has a rear housing 212 in which is mounted a guide (not shown) and a slider 244 like these items in the other devices described herein. A shaper 240 is disposed within a fabric tube 250. The shaper 240 has a first end 253 with threads (not shown) mating with threads (not shown) of the slider. Another end of the shaper 240 is secured to an end connection 254 which has an end fitting 255 with an end opening 256. A trigger 216 extends from the housing 212 and is pivotally mounted to the slider 244 with a pin 221 for action like that of the trigger and yoke of the device 110. As shown in FIG. 5B, gas (e.g. nitrogen) for inflating the fabric tube 250 enters the device 200 through an inlet port 251. A yoke 219 secured to the trigger 216 (like the yoke 115 previously described) is pinned with a pin 260 to the slider 244. A button 262 is movable into and out of a hole 263 in the slider 244 for locking the trigger 216 in its rearmost position to allow two halves of a cover housing (e.g. as in FIG. 1) to be installed on the device.

Relief valves 264 are mounted in the housing in communication with a gas channel through the shaper 240 and are pre-set to relieve gas pressure, e.g. at a level of 50 p.s.i.

In conclusion, therefore, it is seen that the present invention and the embodiments disclosed herein and those covered by the appended claims are well adapted to carry out the objectives and obtain the ends set forth. Certain changes can be made in the described and in the claimed subject matter without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as possible in whatever form its principles may be utilized.

What is claimed is:

1. An inflatable rescue device comprising
   an inflatable flexible tube having a first tube end and a closed second tube end,
   a shaper having a first shaper end, a second shaper end, a gas flow channel extending through the shaper, and a shaper opening for gas flow therethrough,
   the shaper disposed inside the flexible tube with the flexible tube disposed about and along the shaper, the first tube end sealingly secured to the first shaper end, and
   a portion of the flexible tube movable with respect to the shaper, movement of the flexible tube effected by gas under pressure supplied at the shaper opening and flowing through the gas flow channel into the flexible tube inflating the flexible tube and extending it so that it deploys from the second shaper end as it inflates.

2. The device of claim 1 comprising also attachment means on the second tube end for attachment to an object apart from the device.

3. The device of claim 2 wherein the attachment means includes hook means releasably secured to the attachment means for hooking an object.

4. The device of claim 1 including a selectively operable source of gas under pressure connected to the shaper for supplying gas under pressure to the gas opening to inflate the flexible tube.

5. The device of claim 1 including incremental deployment means within the device and interconnected with the shaper for selectively deploying increments of the flexible tube.

6. The device of claim 5 including
   brake means for providing braking action to the flexible tube during its deployment,
   the incremental deployment means including a selectively actuable trigger mechanism,
   the shaper and flexible tube mounted in a housing with an open housing end from which the flexible tube is deployable,
   the brake means mounted in the housing for co-action with a brake portion of the shaper to bind a portion of the flexible tube between the brake means and the brake portion,
   the trigger mechanism inter-connected with the brake means so that activation of the trigger mechanism effects braking action on a portion of the flexible tube preventing further deployment of the flexible tube from the housing.

7. The device of claim 5 including
   the brake means having a brake pad,
   the shaper having a brake insert,
   the flexible tube passing between the brake pad and the brake insert during deployment of the flexible tube, and
   the brake insert moving to bind a portion of the flexible tube between the brake insert and the brake pad to prevent further deployment of the flexible tube.

8. The device of claim 1 wherein the flexible tube has a stowed length when it is on the shaper prior to deployment therefrom and a deployed length when it has been fully deployed from the shaper, and the ratio of the shaper's stowed length to its deployed length is at least 1 to 5.

9. The device of claim 8 wherein the ratio is at least 1 to 20.

10. The device of claim 1 wherein the weight of the flexible tube is one half pound or less.

11. The device of claim 1 wherein the flexible tube is made of fiber fabric impermeable to gas.

12. The device of claim 1 comprising also
    a canister containing gas under pressure,
    a gas flow line interconnected between the canister and the shaper opening, and
    selective flow regulating means interconnected with the canister for selectively permitting gas flow from the canister to the shaper opening to inflate the flexible tube.

13. The device of claim 12 wherein the gas is an inert gas.

14. The device of claim 13 wherein the gas is nitrogen.

15. The device of claim 1 wherein
    the shaper and flexible tube are disposed in a housing, the housing configured to enclose the tube and sized so that upon inflation the tube deploys from the housing.

16. The device of claim 1 wherein the flexible tube when fully extended is at least 20 feet long.

* * * * *